United States Patent [19]

Hartnack

[11] Patent Number: 5,471,247

[45] Date of Patent: Nov. 28, 1995

[54] ELECTRONIC PICTURE REPRODUCTION DEVICE

[75] Inventor: Wolfgang Hartnack, Burgdorf, Germany

[73] Assignee: Deutsche Thomson-Brandt GmbH, Villengen-Schwenningen, Germany

[21] Appl. No.: 57,404

[22] Filed: May 6, 1993

Related U.S. Application Data

[63] Continuation of Ser. No. 750,051, Aug. 27, 1991, abandoned and a continuation of PCT/EP90/00329 filed Feb. 28, 1990.

[30] Foreign Application Priority Data

Mar. 3, 1989 [DE] Germany .......................... 39 06 712.2

[51] Int. Cl.$^6$ ................................................ H04N 5/228
[52] U.S. Cl. .................. 348/402; 348/407; 348/417; 348/420; 382/199
[58] Field of Search ................................ 358/105, 133, 358/136, 135, 166; 382/22, 23; 348/402, 407, 417, 420

[56] References Cited

U.S. PATENT DOCUMENTS

| 4,717,962 | 1/1988 | Moore | 358/260 |
|---|---|---|---|
| 4,727,422 | 2/1988 | Hinman | 358/133 |
| 4,772,947 | 9/1988 | Kono | 358/135 |
| 4,807,033 | 2/1989 | Keesen et al. | 358/167 |
| 4,827,533 | 3/1989 | Tanaka | 382/54 |
| 4,837,618 | 6/1989 | Hatori et al. | 358/135 |
| 4,931,869 | 6/1991 | Amor et al. | 358/133 |
| 4,941,043 | 7/1991 | Jass | 358/133 |
| 5,070,402 | 12/1991 | Ishii et al. | 358/135 |
| 5,093,872 | 3/1992 | Tutt | 358/433 |
| 5,199,082 | 3/1993 | Venema | 382/22 |
| 5,237,410 | 8/1993 | Inoue | 358/136 |
| 5,245,445 | 9/1993 | Fujisawa | 358/458 |
| 5,251,028 | 10/1993 | Iu | 358/133 |

FOREIGN PATENT DOCUMENTS 0250533  7/1987  European Pat. Off. .

Primary Examiner—Michael T. Razavi
Assistant Examiner—Bipin H. Shawala
Attorney, Agent, or Firm—Joseph S. Tripoli; Dennis H. Irlbeck; Ronald H. Kurdyla

[57] ABSTRACT

In a method of reproducing a television picture composed of picture points represented by digital signals, the picture points are grouped into blocks which are separated by block edges. The blocks are one of at least two types of blocks, picture point values for points in one type of block are calculated using one set of rules and picture point values for another type of block are calculated using another set of rules. Values for picture points within the block edges are obtained by combining the values obtained for the respective blocks.

10 Claims, 2 Drawing Sheets

ELECTRONIC PICTURE REPRODUCTION DEVICE

This is a continuation of PCT application PCT/EP 90/00329 filed Feb. 28, 1990 by Wolfgang Hartnack and titled Electronic Picture Reproduction Device. This is a continuation of application Ser. No. 750,051, filed Aug. 27, 1991 now abandoned.

The invention is directed to an electronic picture reproduction device for digital video signals.

The transmission of HDTV (high definition television) signals utilizing HDMAC method (high definition multiplexed analogue components) technique requires motion-adaptive signal processing. The signal processing, typically high resolution in steady picture areas and low resolution in moving picture areas, is uniform within each video signal block of picture points, for example 16×16 picture points; see Technical papers IBC 1988, Brighton, GB, pp. 70 through 73. The picture points of such a video signal block within each video signal block are identified as belonging to a particular block type through a DATV signal (digital assisted television) which is transmitted as information additional to the television signal and which can contain other types of information, for example motion vectors. The numerical values of picture points to be reproduced are determined according to the calculation rules for the different block types and thus, two or more different calculation codes may be used. Because a different method of signal processing is used for the various blocks, the picture characteristics are different for the various blocks, for example the picture sharpness can be different for each block. In an HDTV television receiver the moved signal blocks are interpolated in a motion-compensated way with the aid of the motion/steady information and the motion vectors from the DATV signal, that is the moving picture portions, can be reconstructed in the receiver with a relatively high resolution. If desired, the motion vectors need not be evaluated, and only the motion/steady information is processed. Accordingly, with such a technique the picture points are interpolated in moving video signal blocks in the field at low resolution and in steady video signal blocks with high vertical resolution in the full frame. This allows use of simple processing circuitry.

Motion/steady block borders can be objectionally apparent for picture signals having fine details and partly moving details, or noisy picture signals. The invention reduces the visibility of the block borders with an electronic picture reproduction devices, for example, television receivers.

In principle, the invention lies in the use of an electronic picture reproduction device having a block border softener. The block softener blends the picture points which are in the borders of adjacent blocks, for example by averaging or interpolating. In the block border softener, the numerical values of the picture points bordering other blocks are calculated parallel for the moving details and for the steady details of all the video signal blocks. For the numerical value of picture points within one block and which are directly adjacent to another block, the arithmetical average of the numerical values calculated for both blocks can be used for the respective picture points for moving and for steady video signals. The averaging can occur at both the horizontal and the vertical block borders. Accordingly, the difference of the picture sharpness in adjacent blocks is not visually disturbing even when the adjacent blocks are different types of blocks. The calculation of the picture point numerical values from constantly moving and steady calculated picture point values can also be extended to more than one line and/or column bordering an adjacent block. Reconstruction of video signals which are transmitted in the field method (interlace) can utilize picture point blocks which are marked as moved picture points from the field. However, for video signal blocks which are marked as steady, picture points from two successive fields can be used.

A block of a particular size, for example 16×16 picture points can include moving as well as steady picture points. The reproduction of steady picture points in a block marked as moving, for example, results in only slight vertical blurring of the picture points. The blurring of the steady picture points is adapted to the blurring of the moving picture points in the same block and is visually disturbing, However, the reproduction of moved picture points in a block marked as steady results in severe horizontal blurring and doubled contours of moving edges. For this reason it can be of advantage to perform a composition of moving and steady picture point numerical values at the block edges of only the blocks marked as steady.

Figure 1:
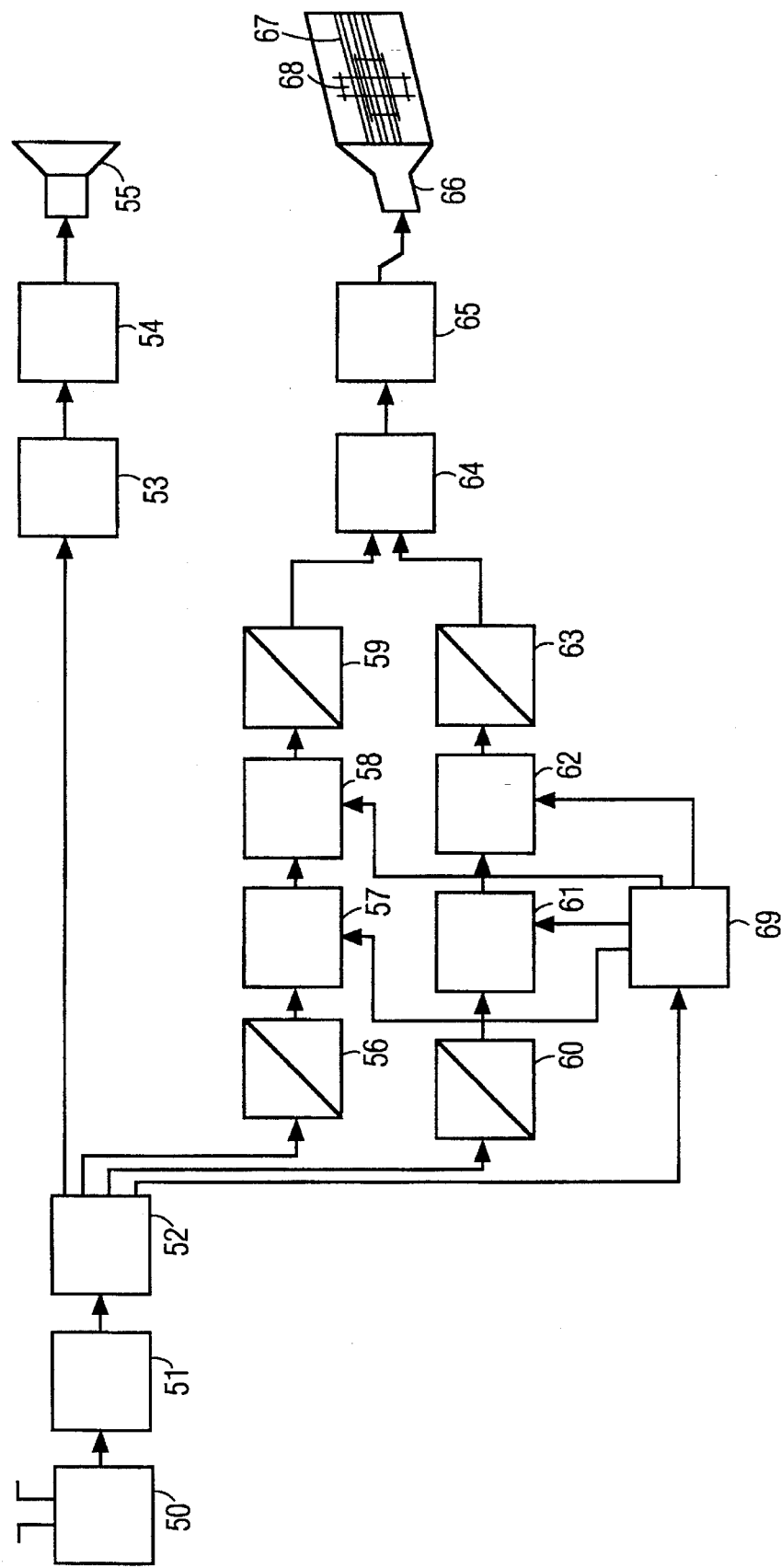
FIG. 1 is a block diagram of a preferred embodiment of an electronic picture reproduction device including a block border softener.

FIG. 1 shows a television tuner 50, an intermediate frequency amplifier 51 and a demodulator 52, which supplies an audio signal, a luminance signal, a chrominance signal and a DATV signal. These signals are transmitted sequentially, for example. The audio signal is processed in an audio processing circuit 53 amplified in an amplifier 54 and transferred to a loudspeaker 55. The DATV signal is processed in a DATV processor circuit 69 which generates block-wise moving/steady information and which provides the information to processor circuits 57 and 61 and for the block border softeners 58 and 62, respectively. The luminance signal is digitalized in the analog-to-digital converter (A/D) 56, and digitally processed in digital processor circuit 57, variated in the block border softener 58 and presented in an analog form in the digital-to-analog converter (D/A) 59. The chrominance signal is digitalized in the analog-to-digital converter 60, digitally processed in digital processor circuit 61, variated in the block border softener 62 and presented in analog form in the digital-to-analog converter 63. The block border softener 62 can be left out for the chrominance signal under certain circumstances. The luminance and the chrominance signals from the digital-to-analog converters 59 and 63 are converted by a matrix 64 into RGB signals and provided to the picture tube 66 via an RGB amplifier 65. On the picture tube 66, television lines 67 and picture point blocks 68 are shown.

Figure 2:
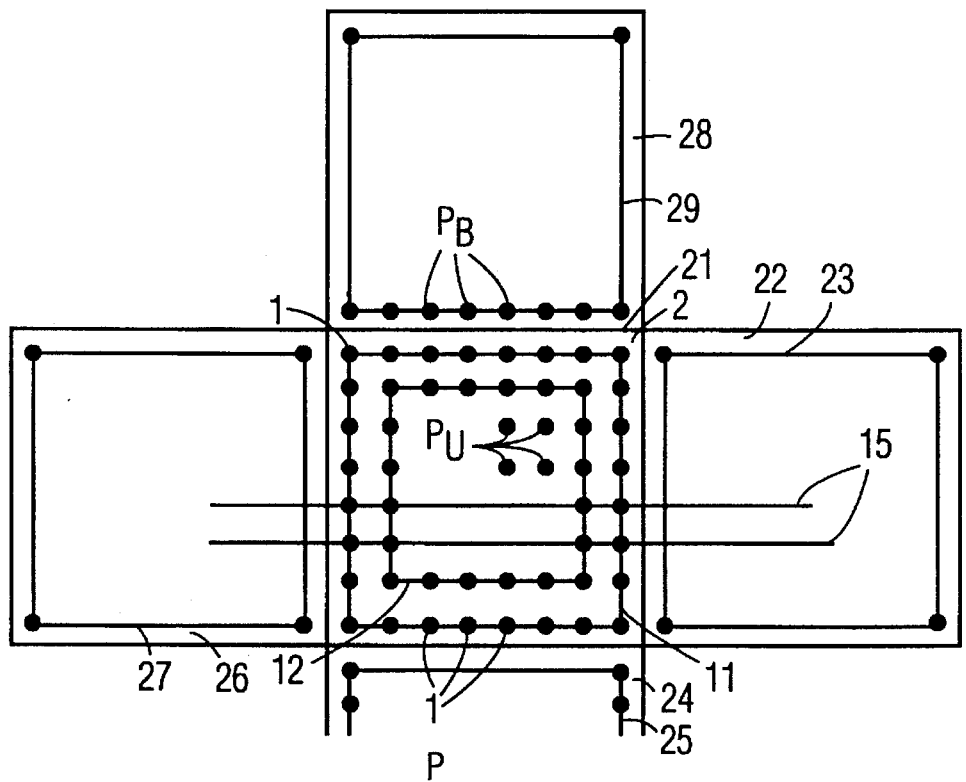
FIG. 2 shows picture point blocks with corrected picture points using averaging correction.

In FIG. 2, five video signal blocks 2, 22, 24, 26 and 28 of a television picture present on the screen of picture tube each have a block size of, for example, 8×8 picture points P. Each of the picture points P lies along a scan line 15 of the video picture. Only a portion of the picture points P is shown. The block 2, for example, stands for a block which is identified by the DATV additional signal as a steady block. Block 2 has a number of border picture points 1 which directly border the adjacent blocks 22, 24, 26 and 28 and are arranged in a ring-shaped way. This arrangement shall hereinafter be referred to as ring 11. The rings 11 for each block are located in the edges of the respective blocks in which they are included.

Block 2 is identified as steady and accordingly the picture points of a ring 12, as well as the other picture points within block 2 and which are inside ring 11, are calculated as steady and are combined from two successive fields of the video signal. Steady picture points are identified as having scanning values $P_u$, moving picture points are identified as having scanning values $P_b$. Picture points in the block borders have scanning values P.

The numerical values of the picture points P within ring 11 are obtained by averaging the steady value $P_u$ of the picture point from the steady (motionless) picture block and the moving value $P_b$ of the picture point from the moving picture block:

$$P=(P_u+P_b)/2$$

The numerical values of the picture points in the rings 23, 25, 27 and 29 are calculated in the same way.

Figure 3:
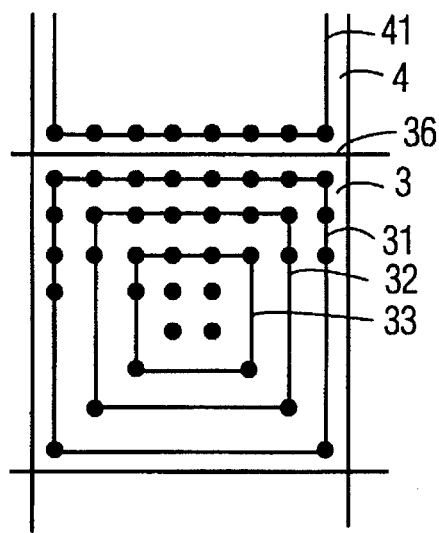
FIG. 3 shows a picture point block with corrected picture points using interpolation correction.

FIG. 3 shows an area of a picture screen with improved softening of the block borders 36. With this technique more rings are used and scanning values are interpolated. A block 4 is identified as moving. All picture points within block 4, including those of ring 41, are calculated as moving. A block 3 is identified as steady. Now the picture points of an inside ring 32 of block 3 can be calculated using the averaging formula $P=(P_u+P_b)/2$. The numerical values P of the picture points of ring 31 can be calculated using the interpolating formula $P=(P_u+3*P_b)/4$ and the numerical values P of the picture points of ring 33 can be calculated using the interpolating formula $P=(3*P_u+P_b)/4$. The picture points lying further inside the block 3 can all be calculated as steady. The number of the rings with picture points calculated according to one of the above formulae can be variated depending on the difference between the moving and the steady calculated picture point numerical values. The numbers in the above formulae can also assume other values, a calculation with numerical values which can be performed by digital add and shift operations also appears useful.

Definitions of terms used herein:

Picture point:

Scanning value of an analog or digital video signal. The scanning values are coded in digital PCM form (pulse code modulation).

Picture point numerical value:

The luminance, or the color, information for the scanning value of a picture point in the form of a numerical value. The numerical value can be in an area of, for example, 0 to 255.

Block, video signal block:

An area of a television picture composed of several adjacent picture points. This picture area can be, for example, shaped like a square, a rectangle or a rhombus. In the case of a square the block can be made of, for example, 16 partitions of television lines lying one under the other whereby each line partition contains 16 picture point scanning values.

Block border:

An imaginary border line demarcating the edges of adjacent blocks.

Block edge:

The group of picture points which lie directly at a block border and are not separated by other picture points from the block border.

Calculation rule:

A rule according to which the numerical value of the reproduced picture points are created from numerical values of received picture points.

Calculation mode:

One of two or more available calculation rules.

Block type:

One of two or more available types of blocks. The numerical values of all picture points in such a block are first created according to the calculation rule allocated to the respective block type.

Picture point share:

For a picture point to be reproduced intermediate numerical values are created according to different calculation rules. The actual numerical value of the picture point to be reproduced is composed of percentage shares of the different intermediate numerical values.

Mixing ratio of the numerical values:

The ratio of the percentage shares. Example: 75 percent share according to calculation mode A, 25 percent share according to calculation mode B results in a mixing ratio of 3:1.

HDTV:

High definition television, television signal with a higher number of lines and/or picture points per line.

DATV:

Digitally assisted television, television with a digital additional signal. A television signal transmitted via a standard cable with which a digital additional information is transmitted along which is required for reconstruction of the reproduced picture in full quality.

To interpolate in a motion-compensated way:

For picture contents of television pictures motion speeds and the directions of movement are determined between two television pictures. An intermediate picture which has to be newly determined and which is to be generated in the time between the already existing television pictures, can thus be created without such disturbances that are normally caused by movement in the picture.

I claim:

1. In a system for processing a video signal representing a single image constituted by a plurality of image processing blocks with adjacent blocks being separated by a border region, each block containing a plurality of picture elements (pixels), each block exhibiting either first and second different types of image motion, associated with static image content or dynamic image content and each block having a perimeter pixel region comprising edge pixels and pixels in the immediate vicinity of said edge pixels; perimeter pixel blending apparatus for selectively modifying perimeter pixel values to soften border regions of adjacent blocks when exhibiting different types of motion, comprising:

a signal source providing a digital representation of said video signal;

a signal processor responsive to said video signal for providing a control signal indicating the type of motion of said first or second types respectively associated with said image blocks;

a digital signal processor responsive to said control signal and to said digital representation of said video signal, for processing image blocks in accordance with the type of motion identified by said control signal for respective blocks;

an adaptive signal translating network responsive to an output signal from said digital processor for selectively providing, when a first block and an adjacent second block exhibit different types of motion, an output video signal with original edge pixel values of said first block substantially exclusive of inner pixels of said first block selectively modified as a function of both (a) a first rule is used to determine the original pixel values of said first block which exhibits said static image content, and (b) a second rule is used to determine pixel values in a block which exhibits said dynamic image content; and an image display device responsive to said output video signal from said translating network.

2. Apparatus according to claim 1, wherein said first block contains motionless image information, and said second block contains moving image information.

3. Apparatus according to claim 1, wherein said output video signal from said translating network represents edge pixels of said first block with averaged values.

4. Apparatus according to claim 1, wherein said signal translating network modifies pixels along horizontal and vertical edges.

5. Apparatus according to claim 1, wherein said output video signal from said translating network represents edge pixels of said first block with interpolated values.

6. Apparatus according to claim 1, wherein said first block includes additional pixels adjacent to said edge pixels, and further pixels adjacent to said additional pixels; said additional pixels and said further pixels being substantially exclusive of inner pixels of said first block; and said translating network selectively provides said output video signal representing said additional pixels with modified values derived from pixel values of said first block and from said adjacent second block.

7. Apparatus according to claim 6, wherein said first block contains motionless image information;

said second block contains moving image information; and said output signal from said translating network represents edge pixels with interpolated values, and said additional pixels with averaged values.

8. Apparatus according to claim 7, wherein said output video signal from said translating network represents said further pixels with interpolated values.

9. Apparatus according to claim 1, wherein said edge pixels of said first block processed by said translating network to produce said modified pixel values are aligned in one spatial direction with edge pixels of said second block.

10. Apparatus according to claim 1, wherein said signal translating network is additionally responsive to said control signal.

* * * * *